US006745673B1

(12) United States Patent
Martinez

(10) Patent No.: US 6,745,673 B1
(45) Date of Patent: Jun. 8, 2004

(54) OUTDOOR COOKING APPARATUS AND ENCLOSURE FOR AN OUTDOOR COOKING DEVICE

(76) Inventor: Julio N. Martinez, 37 SW. 76th Ct., Miami, FL (US) 33144

( * ) Notice: Subject to any disclaimer, the term of this patent is extended or adjusted under 35 U.S.C. 154(b) by 0 days.

(21) Appl. No.: 10/392,210

(22) Filed: Mar. 19, 2003

(51) Int. Cl.[7] .......................... A47J 37/00; A47J 37/04; A47J 37/07

(52) U.S. Cl. ........................ 99/421 H; 99/340; 99/419; 99/427; 99/450; 99/482; 99/449; 126/9 R; 126/25 R

(58) Field of Search ........................ 99/331, 339, 340, 99/341, 400, 401, 419–421 V, 427, 444–450, 481, 482; 126/25 R, 9 R, 41 R, 299 C, 369, 20; 219/400, 401–404, 385, 386, 440; 426/523, 466; 312/236

(56) References Cited

U.S. PATENT DOCUMENTS

| | | | |
|---|---|---|---|
| 3,113,504 A | * | 12/1963 | Reed ........................ 99/421 H |
| 3,195,442 A | | 7/1965 | Russell |
| 3,247,827 A | * | 4/1966 | Cremer ..................... 99/421 H |
| 3,733,999 A | * | 5/1973 | Bernstein .................. 99/339 X |
| 4,325,294 A | | 4/1982 | Hammond |
| 4,462,306 A | | 7/1984 | Eisendrath |
| 4,598,690 A | * | 7/1986 | Hsu .......................... 126/25 R |
| 4,622,945 A | | 11/1986 | Glitten |
| 4,836,179 A | | 6/1989 | Schlosser et al. |
| 4,840,118 A | | 6/1989 | Rinehart |
| 4,867,130 A | | 9/1989 | Walker |
| 4,924,766 A | * | 5/1990 | Hitch ..................... 99/421 HV |
| 5,007,403 A | * | 4/1991 | Chen ........................... 219/401 |
| 5,184,599 A | | 2/1993 | Stuart |
| 5,195,425 A | * | 3/1993 | Koziol ..................... 99/447 X |
| 5,279,214 A | | 1/1994 | Lamendola |
| 5,333,540 A | * | 8/1994 | Mazzocchi ................ 99/450 X |
| 5,421,318 A | * | 6/1995 | Unruh et al. ................ 126/9 R |
| 5,536,518 A | * | 7/1996 | Rummel ..................... 426/523 |
| 5,649,475 A | * | 7/1997 | Murphy et al. ........... 99/421 H |
| 5,819,639 A | * | 10/1998 | Spell ........................ 99/446 X |
| 5,832,811 A | * | 11/1998 | King ........................ 99/419 X |
| 5,947,007 A | | 9/1999 | O'Grady et al. |
| 6,437,291 B1 | | 8/2002 | Hopponen |

* cited by examiner

Primary Examiner—Timothy F. Simone
(74) Attorney, Agent, or Firm—Malloy & Malloy, P.A.

(57) ABSTRACT

An outdoor cooking device including a base having a lid movably mounted thereto and disposable between an open configuration and a closed configuration. A main seal is provided along a main interface to permit the lid to substantially enclose an upper portion of the base when in the closed configuration so as to restrict access to the interior of the apparatus by the elements and/or various insects, small animals, as well as other pests and vermin. Additionally, the apparatus includes a plurality of ports as required for operation of the outdoor cooking apparatus, and a port seal assembly structured and disposed in sealing engagement with at least some of the plurality of ports, while the apparatus is not in use. The apparatus may also include a skirt and a skirt cover structured to substantially enclose a lower portion of the base, while the apparatus is not in use.

31 Claims, 7 Drawing Sheets

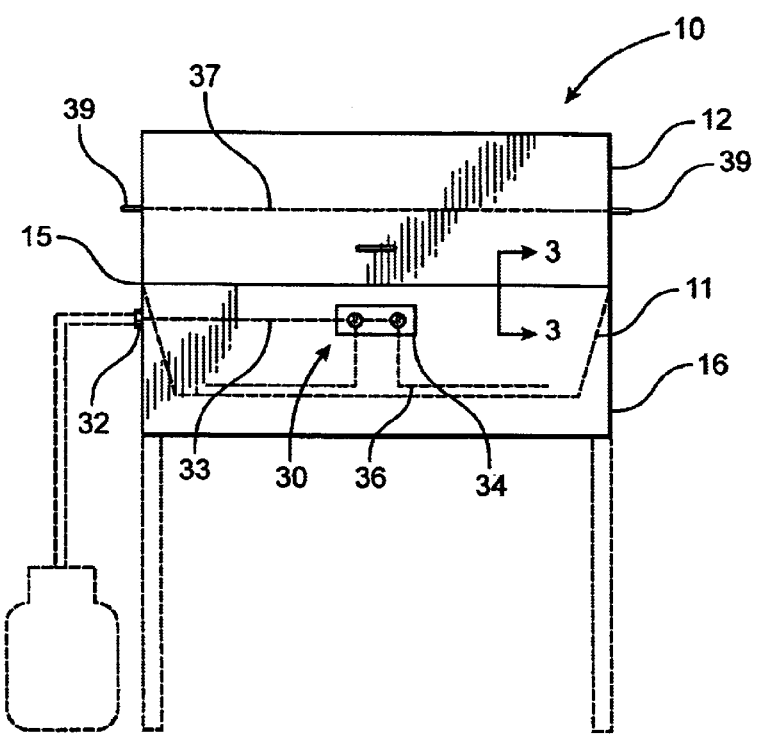
FIG. 1
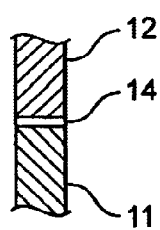
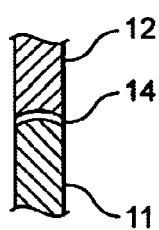
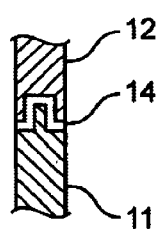
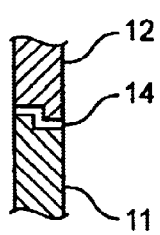
FIG. 3A   FIG. 3B   FIG. 3C   FIG. 3D

OUTDOOR COOKING APPARATUS AND ENCLOSURE FOR AN OUTDOOR COOKING DEVICE

BACKGROUND OF THE INVENTION

1. Field of the Invention

The present invention is directed to an outdoor cooking apparatus, such as a grill or a barbeque. Specifically, the invention is directed to an outdoor cooking apparatus that may be substantially enclosed when not in use so as to restrict access to an interior of the apparatus by the elements, thereby minimizing maintenance and increasing its useful life. The substantial enclosure also serves to restrict access and entry of insects, small animals, and other pests or vermin into the outdoor cooking apparatus, thereby minimizing potential operational and health related hazards. The present invention further relates to an enclosure for an existing outdoor cooking device in both an operative orientation as well as a substantially enclosed stored orientation.

2. Description of the Related Art

The art of outdoor cooking has been practiced since prehistoric man discovered the means to harness fire for such useful purposes. Unlike prehistoric man, people today have a wide variety of choices when it comes to selecting an outdoor cooking device. The simplest of these devices consists of no more than a base for holding charcoal, or another combustible fuel source, to provide the heat and/or flame to cook over, and an overlying grate on which to place the food being cooked. Such devices may also include a lid or cover to at least partially protect the interior of the device from the elements, such as rain, sleet, and/or snow.

Often times the lid or cover of such a device may also serve as a support for a spit or rotisserie rod, which normally extends through an opening in at least one side of the lid so that it may be rotated, thereby allowing the food attached to be rotated over the heat and/or flame while the lid or cover remains closed. The lid or cover may also include one or more ventilation opening therethrough. In addition, such devices typically include one or more openings through the base portion to permit the release of grease generated from the food being cooked, as well as for the ease of removal of the ashes from the consumed fuel source.

In more recent times, outdoor cooking devices utilizing liquid or gaseous fuels, such as propane or butane, as well as several models utilizing an electric heating means, have dominated the market. In addition to having openings for a rotisserie rod, which may include a motor to achieve continuous, unattended rotation of the food attached thereto, and grease, clean out, and ventilation openings, as described above, these devices often include several additional openings through the housing, such as are required to supply the natural gas or electricity required, as well as to at least partially support one or more cooking racks with the lid of the device.

As such, even the most modern of these devices include a plurality of openings through to their interior, such that the elements including, for example, rain, wind, dust, sleet, and/or snow may easily enter the interior of the device. Among the problems associated with the elements include premature rusting of the device, as they are typically constructed of some form of metal, and damage to any combustible, heating and/or flavoring materials enclosed within the device. In addition, excessive dust entering the interior of the device may result in clogging of the fuel lines and/or burners on natural gas burning devices, thus creating a potentially serious safety hazard. The negative impact of the elements on such an outdoor cooking device are well known, and are evidenced by the fact that most manufacturers of these devices offer an external fabric cover to be placed over at least the upper portion of the device while it is not in use.

Besides the deleterious effects of the elements, insects, or other pests may access the interior of an outdoor cooking the device through such openings, creating an additional set of potential problems, such as by nesting therein. Spiders have been known to enter and clog the fuel lines and/or burners of natural gas burning devices, and flying pests such as wasps and hornets have been known to build nests in such devices, and have provided more than one user with an unpleasant surprise upon attempting to use the device.

In addition to insects, small animals such as lizards and snakes may access the interior of the device, and be in advertently cooked along with the selected food, which, although not likely to present serious health issues, certainly may ruin a person's appetite upon discovery of the unwanted additions to the menu. More importantly, disease carrying vermin, such as cockroaches, rats, or other small rodents, may also access the interior of the outdoor cooking device, thereby presenting real and potentially serious health hazards by transmitting diseases to the cooking surfaces of the device.

As such, it would be beneficial to provide an outdoor cooking apparatus that may be substantially enclosed when not in service so as to restrict access to its interior by the elements or any of the insects, small animals, or vermin noted above. It would be preferable if such an outdoor cooking apparatus is able to utilize natural gas, electricity, charcoal, or any other common fuel source. It would also be helpful to provide an enclosure for an existing outdoor cooking device, such that an owner of an existing device is not required to replace an otherwise satisfactorily functioning outdoor cooking device to which they are accustomed, yet still enjoy the benefits of substantially enclosing the device while it is not in service.

SUMMARY OF THE INVENTION

The present invention is directed to an outdoor cooking apparatus that may be substantially enclosed when not in service. In particular, the invention comprises a base having a lid movably mounted thereto, the lid being disposable between an open configuration and a closed configuration. A main seal is disposed along a main interface of the base and the lid of the outdoor cooking apparatus, and is preferably continuously disposed therebetween. The apparatus is structured such that the closed configuration of the lid is at least partially defined by the lid being disposed in a substantially enclosing relation to an upper portion of the base along the main seal. The substantially enclosing relation is such that access to an interior of the apparatus by the elements and/or unwanted pests is restricted.

The apparatus of the present invention also includes a plurality of ports formed therethrough in communicating relation to its interior, such as are commonly required for ventilation, rotisserie assemblies, heating assemblies, as well as various clean out ports, for example, to facilitate removal of grease and/or ash generated through operation of the apparatus. In order to provide for an apparatus which is substantially enclosed while not in service, the present invention includes a port seal assembly structured and disposed in a sealing engagement with at least some of the plurality of ports. This sealing engagement is also structured so as to restrict access to the interior of the apparatus by the elements and/or any of the various pests indicated above. More specifically, the main seal and the port seal assembly are structured to restrict access to the interior of the apparatus while the lid is disposed in the closed configuration and the port seal assembly is disposed in sealing engagement with at least some of the plurality of ports.

In at least one embodiment, the apparatus of the present invention also includes a skirt disposed in an at least partially overlying relation to a lower portion of the base. This embodiment also includes a skirt cover structured to engage the skirt and being disposable between an operable configuration and a storage configuration. In particular, the storage configuration is defined by the skirt and the skirt cover being structured to further restrict access to the lower portion of the base while the skirt cover is disposed in the storage configuration.

The present invention is also directed to an enclosure for an existing outdoor cooking device. Specifically, the present invention provides for a housing structured to cooperatively engage the existing outdoor cooking device in an at least partially enclosing relation. The housing includes at least one door disposable between an open position and a closed position. The housing also includes a doorway seal disposed along a doorway interface between the housing and the door. At least one embodiment provides for a plurality of doors, each disposable between the open position and the closed position.

The enclosure also includes a housing cover structured to engage the housing, the housing cover being disposable between an operable position and a storage position. A housing seal is provided and is disposed along a housing interface between the housing and the housing cover. The housing seal is structured such that the enclosure is substantially sealed when the doors are disposed in the closed position and the housing cover is disposed in the storage position.

Additionally, this embodiment provides for an adjustable support mechanism disposed within the housing, the adjustable support mechanism being structured to support the outdoor cooking device in an operative orientation. Further, the present embodiment includes a lift mechanism interconnected to the adjustable support mechanism which is structured to selectively raise and lower the support mechanism and the outdoor cooking device, while disposed within the housing.

In this embodiment, the outdoor cooking device is substantially enclosed within the housing while the door or doors are disposed in the closed position, and the housing cover is disposed in the storage position. Specifically, the housing is structured to substantially enclose an existing outdoor cooking assembly so as to restrict access to an interior of the device by the elements and/or various pests, including, by way of example only, those identified above.

These and other features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 1 is front elevation of one preferred embodiment of an outdoor cooking apparatus according to the present invention.

FIGS. 3A through 3D illustrate alternate embodiments of a main seal along lines 3—3 of FIG. 1.

Like reference numerals refer to like parts throughout the several views of the drawings.

DETAILED DESCRIPTION OF THE PREFERRED EMBODIMENT

As previously indicated, the present invention is directed to an outdoor cooking apparatus, generally shown as 10 throughout the figures. The outdoor cooking apparatus 10 is structured such that it may be substantially enclosed when not in use so as to restrict access to the interior of the apparatus 10 by the elements. The substantial enclosure of the outdoor cooking apparatus 10 is also such that it restricts access to the interior by any number of small animals including, but not limited to, various insects, rodents, lizards, and/or other vermin (hereinafter, collectively "pests"). Thus, by substantially enclosing the outdoor cooking apparatus 10 of the present invention, the interior of the outdoor cooking apparatus 10 is protected from the deleterious effects which may result from exposure to the elements and the various pests, such as an increase in required maintenance and a reduction in the useful life of the apparatus 10.

Figure 5:
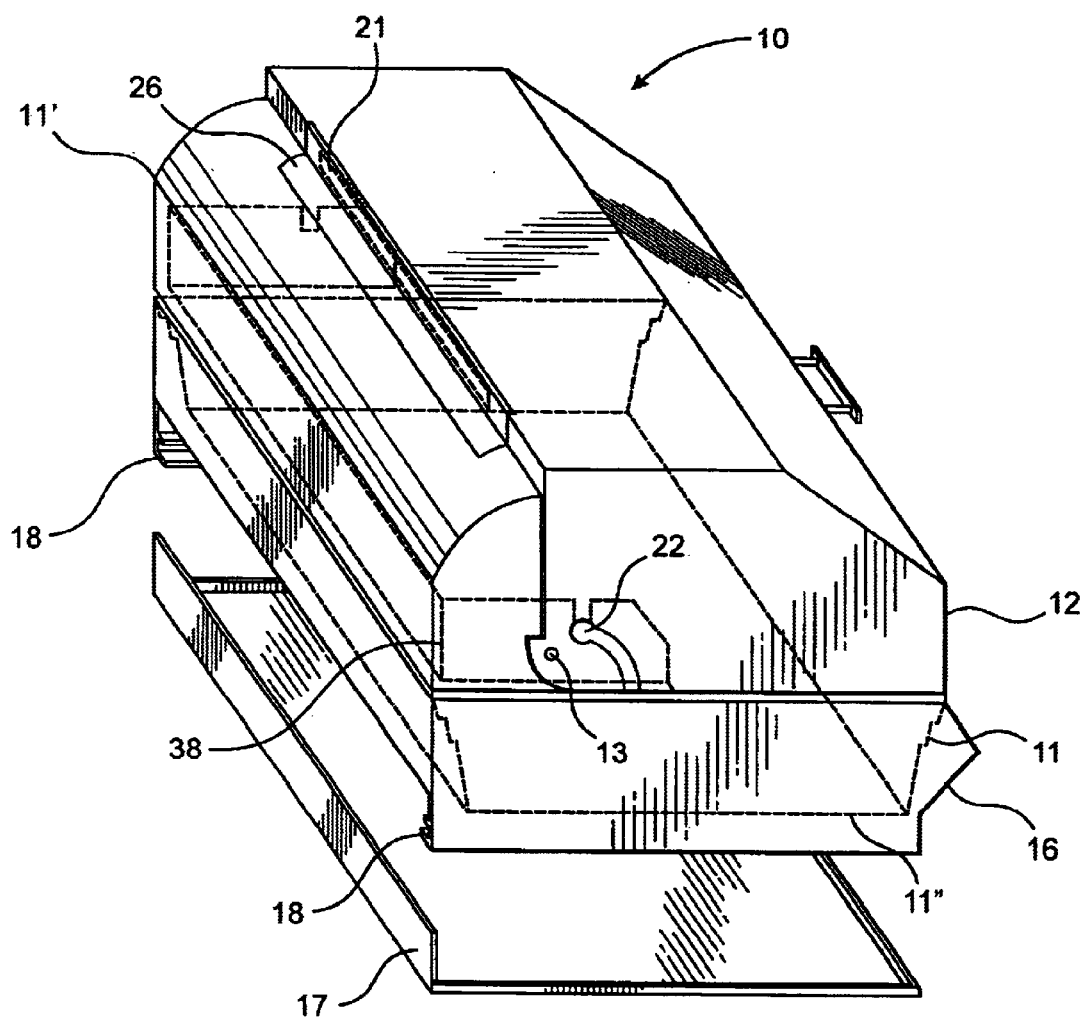
FIG. 5 is a perspective view of one other preferred embodiment of an outdoor cooking apparatus illustrating a ventilation cover and a skirt cover.
Figure 8:
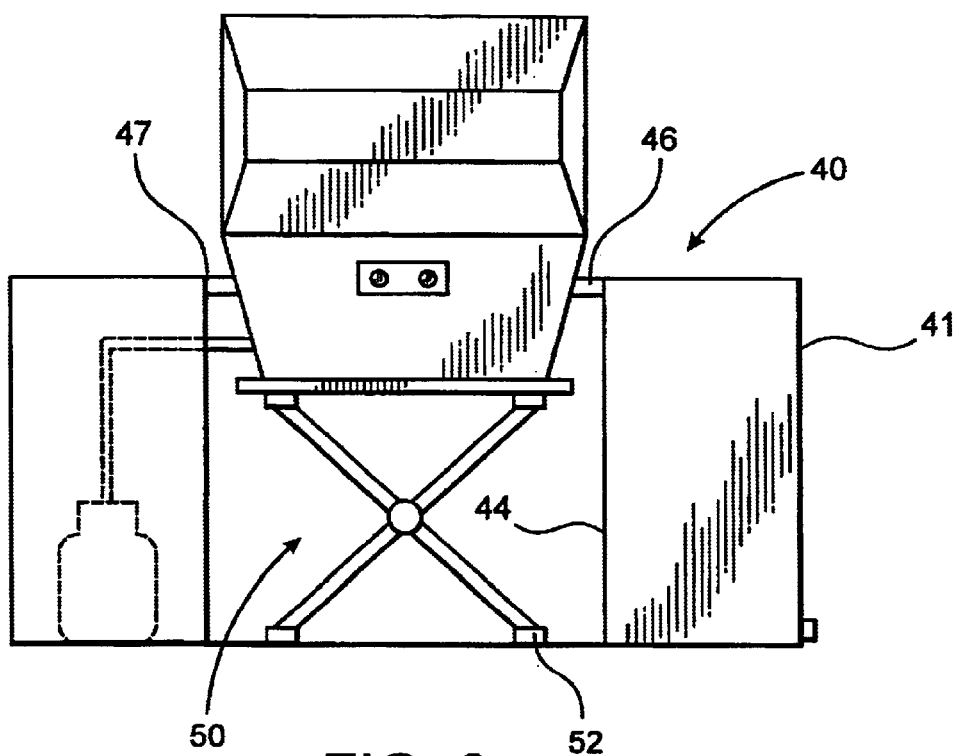
FIG. 8 is a front elevation of one preferred embodiment of an enclosure for an existing outdoor cooking device according to the present invention illustrating the existing device in an operative position.

One preferred embodiment of the outdoor cooking apparatus 10 includes a base 11 in which food may be cooked. The base 11 may be structured to utilize any one of a number of heat sources including, by way of example, charcoal, gas burning elements, or electric heating elements. Additionally, the base 11 is structured to receive a lid 12 movably mounted thereto. More specifically, the lid 12 is mounted to the base 11 in such a manner that the lid 12 is selectively disposable between a closed configuration, as illustrated in FIGS. 1, 2, 5, and 9, or an open configuration, as shown in FIG. 8. One or more lid mounts 13 may be employed such that the lid 12 is movably yet securely mounted to the base 11. The lid mounts 13 may include a hinge pin and flange assembly having a close tolerance to one another, as illustrated in FIG. 5. It is understood to be within the scope of the present invention, however, that other lid mounts 13 may be utilized such that the lid 12 is movably mounted to the base 11, provided that the tolerance between the components of the lid mounts 13 are close enough to one another so as to maintain the substantial enclosure of the outdoor cooking apparatus 10 to restrict access to the interior of the outdoor cooking apparatus 10 to the elements and/or various pests, while the lid 12 is disposed in the closed configuration.

A main interface 15 is at least partially defined at the intersection of the peripheral surfaces of the base 11 and the lid 12, while the lid 12 is disposed in the closed configuration. Further, a main seal 14 is disposed along the main interface 15 and, in at least one preferred embodiment, the main seal 14 is disposed continuously along the main interface 15 between the base 11 and the lid 12. As illustrated in FIGS. 3A through 3D, the main seal 14 may simply comprise the abutment of relatively flat peripheral surfaces along the main interface 15, as shown in FIG. 3A, or the main seal 14 may comprise any number of geometrically complimentary peripheral surfaces disposed along the main interface 15, as illustrated in FIGS. 3B through 3D. Alternatively, the main seal 14 may comprise a separate material disposed along the main interface 15, for example, the heat resistant material disposed around the door of a standard indoor oven.

In at least one embodiment, the main seal 14 is structured and disposed such that the closed configuration of the lid 12 at least partially defines a substantially enclosing relation of the lid 12 with an upper portion 11' of the base 11 along the main interface 15. As indicated above, the substantial enclosure of the outdoor cooking apparatus 10 of the present invention restricts access to the interior of the outdoor cooking apparatus 10 by the elements and the various unwanted pests.

The outdoor cooking apparatus 10 of the present invention further comprises a plurality of ports, generally shown as 20, through either the base 11, the lid 12, or both. In particular, the outdoor cooking apparatus 10 comprises the plurality of ports 20 being structured to permit access into the interior of the apparatus 10 while the lid 12 is disposed in the closed configuration, as may be required for any one of a number of functions. For example, it is preferable, and in some cases, required, to provide at least one ventilation port 21, to facilitate the entry of fresh air, and in particular, oxygen, as it is required for combustion of gas or other fuels which may be utilized by the outdoor cooking apparatus 10. Further, and particularly when gaseous fuel is utilized, the ventilation port may be required to assure an explosive environment is not created within the outdoor cooking apparatus 10 which could result in serious injury and possibly death to a user unwittingly introducing a source of ignition into such an environment.

Figure 6:
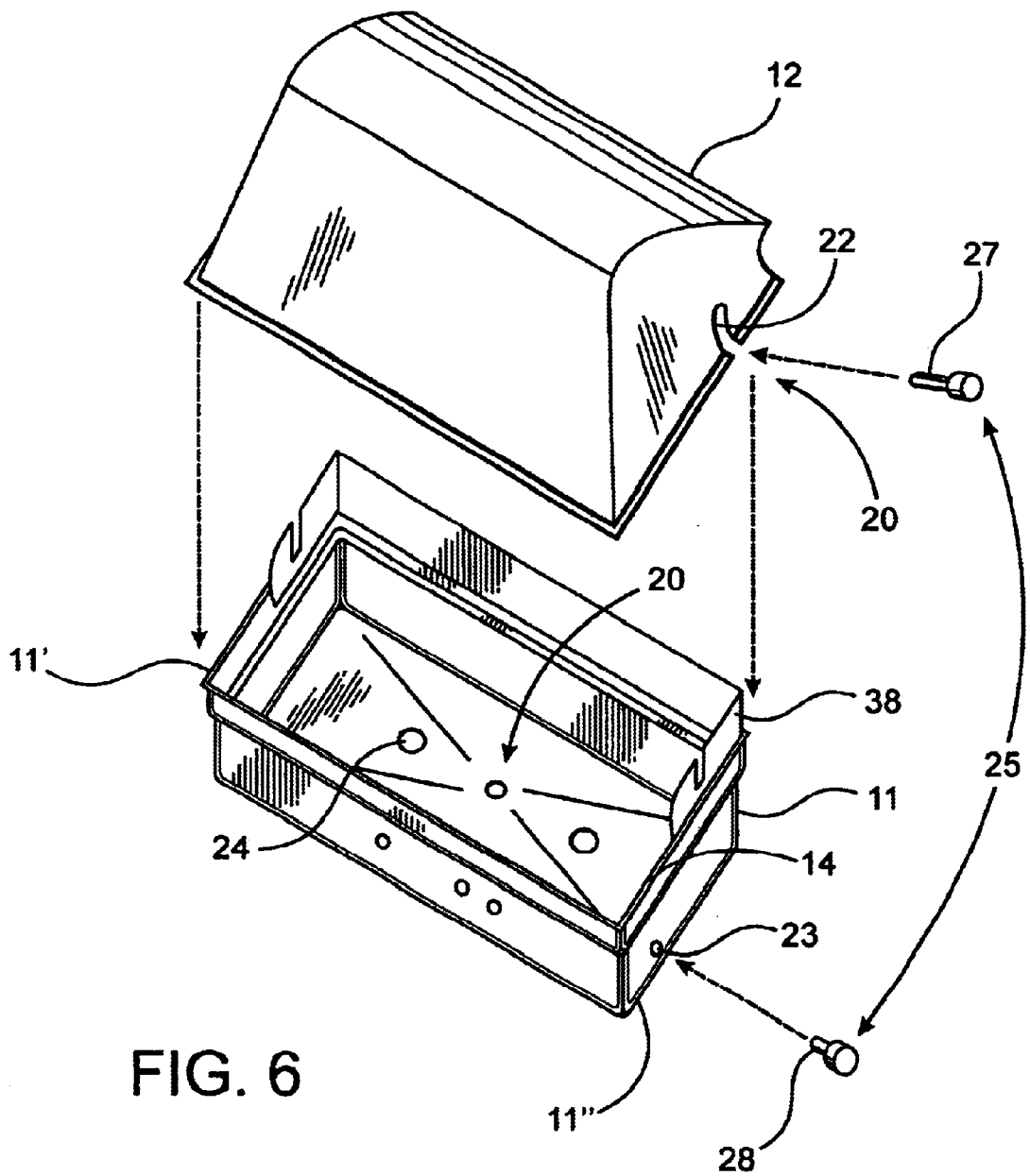
FIG. 6 is a partial exploded perspective view of a base and a lid of the present invention.
Figure 7:
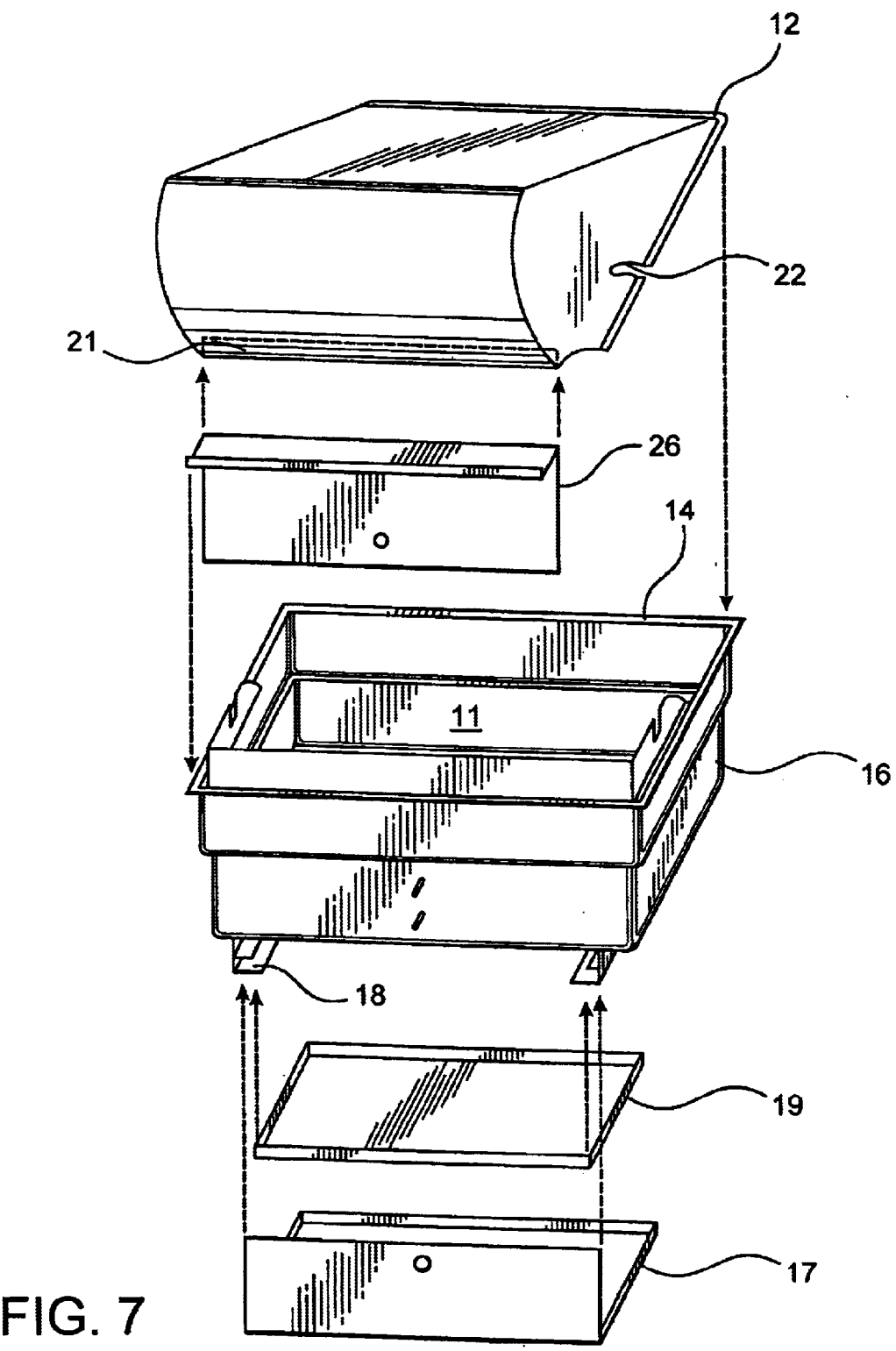
FIG. 7 is a partial exploded perspective view of one preferred embodiment of the present invention illustrating a skirt assembly.

In at least one embodiment, the outdoor cooking apparatus 10 of the present invention may also include one or more rotisserie ports, as shown at 22. The rotisserie ports are structured to permit at least one end 39 of a rotisserie rod 37 to extend through the lid 12 of the outdoor cooking apparatus 10, while the lid 12 is disposed in a closed configuration. A rotisserie support 38 may be mounted to an interior portion of the base 11, as illustrated in FIGS. 5 through 7, such that the rotisserie rod 37 is maintained in an operative position. More importantly, the rotisserie port(s) 22 allow the rotisserie rod 37 to be accessed from the exterior of the outdoor cooking apparatus 10 such that the rotisserie rod 37, and thus, any food attached thereto, may be rotated while the lid 12 remains in the closed configuration. Further, the rotisserie port(s) 22 permit the lid 12 to be alternately and selectively disposed between the closed configuration and the open configuration, without disturbing the rotisserie rod 37 or the food attached thereto. The rotisserie rod 37 may be rotated intermittently, such as by connection of at least one end 39 of the rotisserie rod 37 to a hand held crank. Alternatively, the rotisserie rod 37 may be rotated continuously utilizing a standard rotisserie motor attached to at least one end 39 of the rotisserie rod 37.

In addition to the ventilation port(s) 21 and the rotisserie port(s) 22, the outdoor cooking apparatus 10 of the present invention may comprise, by way of example only, one or more ignition ports 23 to permit the introduction of a source of ignition to an amount of fuel within the apparatus 10, while the lid 12 is disposed in a closed configuration. Additional ports 20 may be provided to permit the entry of fuel or power as may be required by one or more heating elements 36, for example, gas burning elements or electric heating elements, respectively. Also, the outdoor cooking apparatus 10 may comprise one or more grease/ash clean out ports 24, preferably disposed through the lower portion 11" of the base 11, structured to facilitate removal of grease and/or ash from the apparatus 10, either while cooking, or after use.

In addition to the plurality of ports 20, the outdoor cooking apparatus 10 of the present invention comprises a port seal assembly 25 structured and disposed in a sealing engagement with at least some of the plurality of ports 20. The port seal assembly 25 of the present invention is structured to engage at least some of the plurality of ports 20, and the sealing engagement is at least partially defined so as to further restrict access to the interior of the outdoor cooking apparatus 10 while the lid 12 is disposed in the closed and substantially enclosing relation with the upper portion 11' of the base 11, along the main seal 14.

Figure 2:
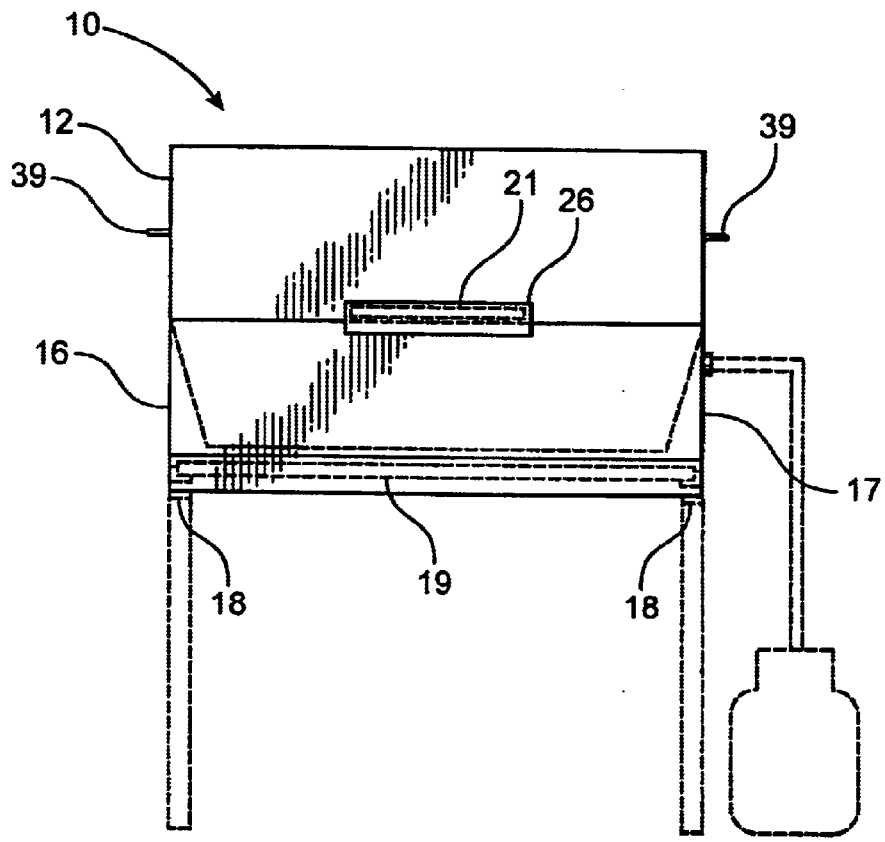
FIG. 2 is a rear elevation of the outdoor cooking apparatus of FIG. 1.

In particular, the port seal assembly 25 may comprise a plurality of port covers, each structured to engage and seal a different one of the plurality of ports 20. For example, at least one embodiment of the present invention comprises a ventilation cover, shown as 26 throughout the figures. As shown in FIGS. 2, 5, and 7, the ventilation cover 26 may be mounted across an interface of the upper portion 11' of the base 11 and the lid 12 of the outdoor cooking apparatus 10 of the present invention. More in particular, in the embodiment of FIGS. 2, 5, and 7, the ventilation cover 26 may comprise a rigid material of construction so as to prevent disposition of the lid 12 into the open configuration while the ventilation cover 26 is disposed in sealing engagement with the ventilation port 21. This serves as a safety measure, particularly when gaseous fuel is utilized, by requiring the user to remove the ventilation cover 26 prior to opening the lid 12 to place food within the outdoor cooking apparatus 10, thus assuring adequate ventilation is provided while the apparatus 10 is in use to prevent the development of an explosive environment within the interior of the apparatus 10 due to inadequate ventilation.

In addition, the port seal assembly 25 may comprise one or more rotisserie covers 27 and an ignition cover 28, as applicable. As illustrated in FIG. 6, the rotisserie cover 27 and the ignition cover 28 may comprise a simple plug-like device which may be inserted through the corresponding port 22 or 23, respectively, to provide a seal around the periphery of the port while the corresponding cover is disposed in sealing engagement. Additional covers may be provided in sealing engagement with the grease/ash clean out ports 24. In addition to the plug-like devices described above, it is understood that one or more slidingly or hingedly mounted covers may be utilized to seal the rotisserie port(s) 22, the ignition port(s) 23, and/or the grease/ash clean out ports 24.

At least one preferred embodiment of the outdoor cooking apparatus 10 of the present invention further comprises a skirt 16. More in particular, the skirt 16 is structured and disposed in an at least partially overlying relation to a lower portion 11" of the base 11, wherein the skirt 16 is also interconnected to the base 11. In addition, at least one embodiment of the outdoor cooking apparatus 10 further comprises a skirt cover 17 structured to engage the skirt 16. Preferably, the skirt cover 17 engages the skirt 16 such that the skirt cover 17 is disposable between an operable configuration which is at least partially detached from the skirt 16, as illustrated in FIG. 5, and a storage configuration, as shown in FIG. 2. In at least one embodiment, the skirt cover 17 is moveably attached to the skirt 16, such as, for example, via a hinge connection, which allows the skirt cover 17 to be disposable between, the operable configuration and the storage configuration. More importantly, however, is that the skirt 16 and the skirt cover 17 are structured to further restrict access to the lower portion 11" of the base 11 by the elements and the various pests, including at least those noted above, while the skirt cover 17 is disposed in the storage configuration.

In one preferred embodiment, the skirt 16 of the present invention also incorporates a skirt guide 18 to facilitate disposition of the skirt cover 17 into the storage configuration. As best illustrated in FIGS. 5 and 7, the skirt guide 18 may comprise one or more flanges structured to engage and at least partially support the skirt cover 17 in the storage configuration such that the lower portion 11" of the base 11 is substantially enclosed. The skirt 16 and the skirt cover 17 may also comprise a skirt seal along an interface therebetween, the skirt seal may be structured similar to the main seal 14 described above, to facilitate substantially enclosing the lower portion 11" of the base 11, however, it is understood that other sealing structures may be utilized within the scope of the present invention.

The skirt guide 18 may also comprise an additional pair of flanges, in at least one embodiment, structured to at least partially support a collection device 19 underlying at least part of the lower portion 11" of the base 11. The collection device 19 is preferably disposable between a collection configuration, while engaging the skirt guide 18, and a disposal configuration, while at least partially removed therefrom. Specifically, the collection device 19 is structured to receive and at least temporarily store grease and ash generated during the operation of the outdoor cooking apparatus 10 through the grease/ash clean out port(s) 24 disposed along the lower portion 11" of the base 11. Additionally, the collection device 19 is structured for easy, at least partial removal from the skirt guide 18 to facilitate disposal of the grease and ash generated.

At least one embodiment of the outdoor cooking apparatus 10 of the present invention further comprises a heating assembly, generally shown as 30, structured to operatively engage and control an amount of heat generated by one or more heating elements 36 disposed within the base 11 of the apparatus 10. In one preferred embodiment, the heating assembly 30 preferably includes a control panel 34 at least partially mounted to the skirt 16 and having one or more control devices extending therethrough. In another embodiment, the control panel 34 may be mounted directly to the base 11. The control device of the present invention may comprise, for example, a gas valve and a venturi mechanism as are typically utilized to supply fuel to a gas burning heating element 36, thereby controlling the heat generated. In another embodiment, the control device comprises a rheostat or similar mechanism utilized to control the heat generated by an electric heating element 36. A bushing or comparable sealing device is disposed in an engaging relationship to at least a portion of the control device and the base 11 or the skirt 16, so as to maintain a substantial seal around the control device.

The heating assembly 30 also comprises a supply conduit 33 to provide fuel and/or power to the control panel 34 through a supply port 32 which, in at least one embodiment, is mounted through the skirt 16, the supply port 32 being structured to tightly engage at least a portion of the supply conduit 33 to maintain a substantial seal through the skirt 16. Further, while the skirt cover 17 is disposed in the storage configuration, the portion of the control device(s) extending through the skirt 16 and the portion of the supply conduit 33 extending through the supply port 32 will be substantially enclosed along with the lower portion 11" of the base 11.

Figure 4C:
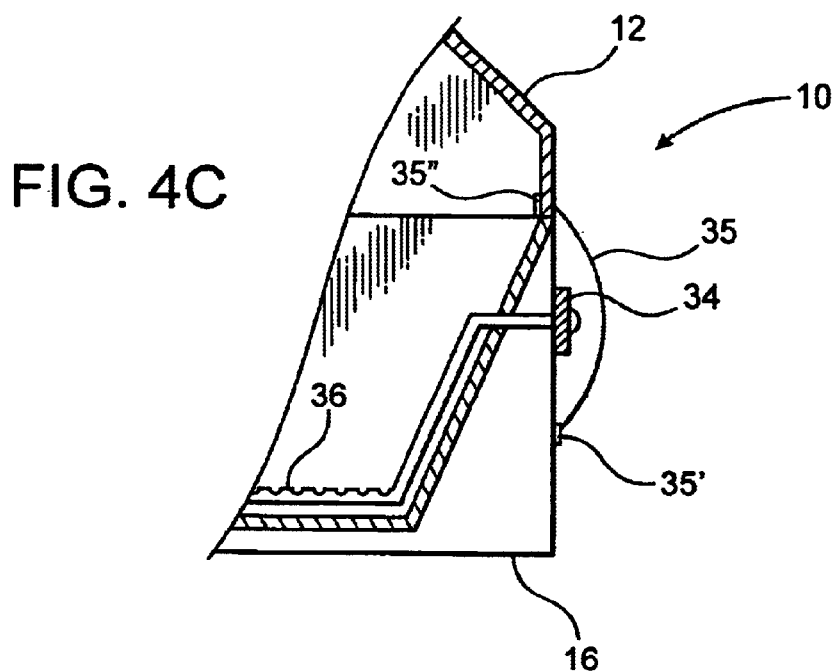
FIG. 4C is a cross-section of the control cover of FIG. 4A, along lines 4C—4C thereof.
Figure 4A:
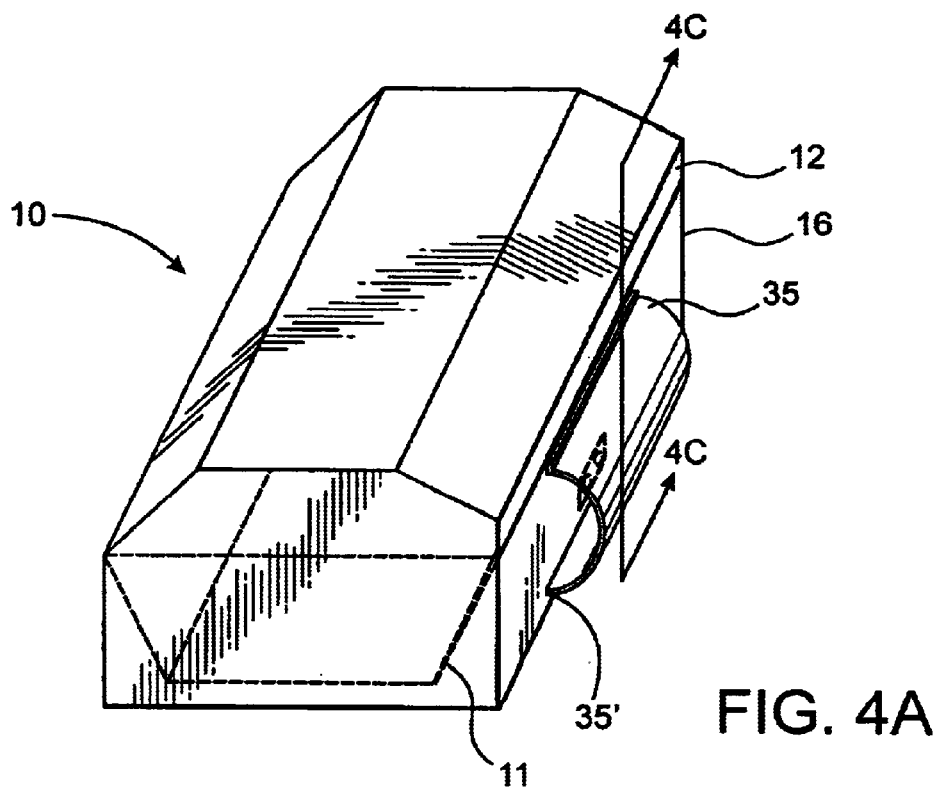
FIG. 4A is a partial perspective view of another embodiment of the present invention illustrating a control cover in a locked orientation.
Figure 4B:
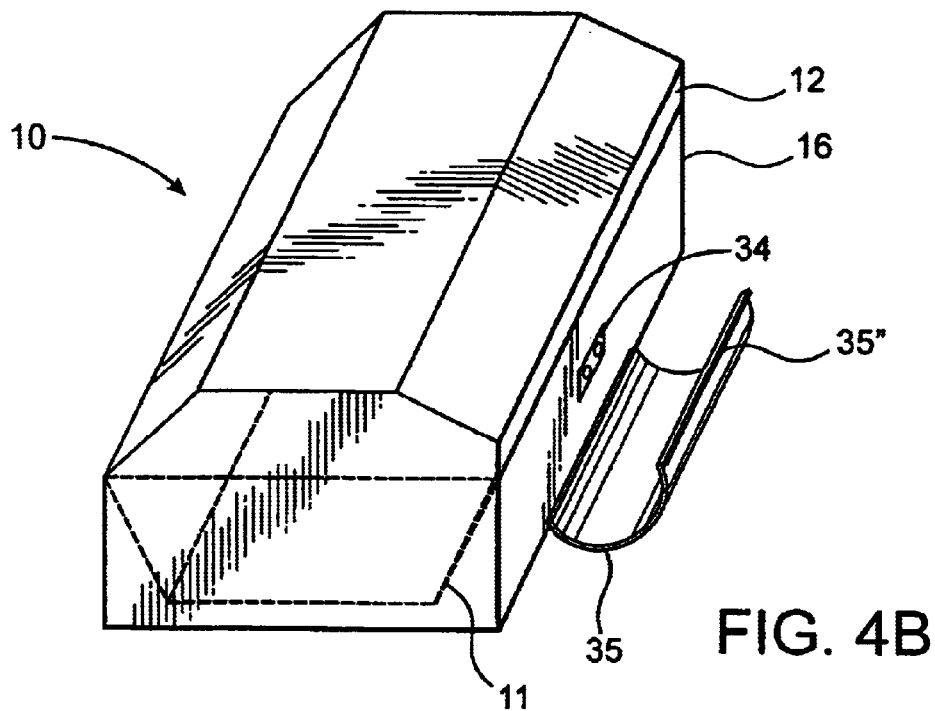
FIG. 4B is a partial perspective view of the embodiment of FIG. 4A illustrating the control cover in an unlocked orientation.

At least one preferred embodiment of the present invention further comprises a control cover 35 movably mounted along a lower edge 35' to the base 11 or the skirt 16, such that the control cover 35 is disposable between a locked orientation relative to the control panel 34, as shown in FIG. 4A, and an unlocked orientation, as illustrated in FIG. 4B. The control cover 35 further comprises an upper edge. 35" being structured and disposed to engage at least a portion of the lid 12, while the lid 12 is disposed in the closed configuration. Specifically, the upper portion 35" of the control cover 35 comprises a flange-like projection, shown in FIG. 4C, which restricts movement of the control cover 35 from the locked orientation into an unlocked orientation, while the lid 12 is disposed in the closed configuration. The locked orientation of the control cover 35 is at least partially defined by the control cover 35 being positioned so as to substantially restrict access to the control panel 34 and, more specifically, to prevent the user from intentionally or inadvertently supplying fuel and/or power to the heating elements 36 inside of the enclosed outdoor cooking apparatus 10 until the lid 12 has been disposed in the open configuration, thereby assuring sufficient ventilation for safe operation. It will be appreciated that the control cover 35, while disposed in the unlocked orientation, provides a convenient support surface for one or more of the various cooking utensils utilized while cooking outdoors.

In light of the foregoing, it is understood that the present invention facilitates substantially enclosing the outdoor cooking apparatus 10 to restrict access to the interior of the apparatus 10 by the elements and/or any of a variety of pests, including at least those noted above. Specifically, the outdoor cooking apparatus 10 presented herein provides the main seal 14 along the main interface 15 of the base 11 and the lid 12 such that the lid 12 may be disposed in a substantially enclosing relation to the upper portion 11' of the base 11 along the main interface 15; the port seal assembly 25 to engage and seal at least some of the plurality of ports 20 which are required to permit normal operation of an outdoor cooking device; and the skirt 16 and skirt cover 17 to provide substantial enclosure around the lower portion 11" of the base 11 via the skirt seal; altogether combining to provide the desired result of resisting access to the interior of the outdoor cooking apparatus 10.

As indicated above, the present invention is also directed to an enclosure, generally as shown as 40, structured to facilitate operation and storage of an existing outdoor cooking device. Specifically, the present invention provides for a housing 41 structured to cooperatively engage the existing outdoor cooking device in an at least partially enclosing relation. The housing 41 includes at least one door 42 disposable between an open position and a closed position.

The housing 41 also includes a doorway seal 43 disposed along a doorway interface 44 between the housing 41 and the door 42. The doorway seal 43 may be structured similar to the main seal 14 described above, but is not limited to such structures. At least one embodiment of the housing 41 provides for a plurality of doors 42, each disposable between the open position and the closed position.

At least one embodiment also includes a housing cover 45 structured to engage the housing 41, the housing cover 45 being disposable between an operable position and a storage position. A housing seal 46 is provided and disposed along a housing interface 47 between the housing 41 and the housing cover 45, such that the housing cover 45 engages the housing 41 in a sealing engagement. Once again, the housing seal 46 may be similar but is not limited to structures such as those described above with respect to the main seal 14.

Figure 9:
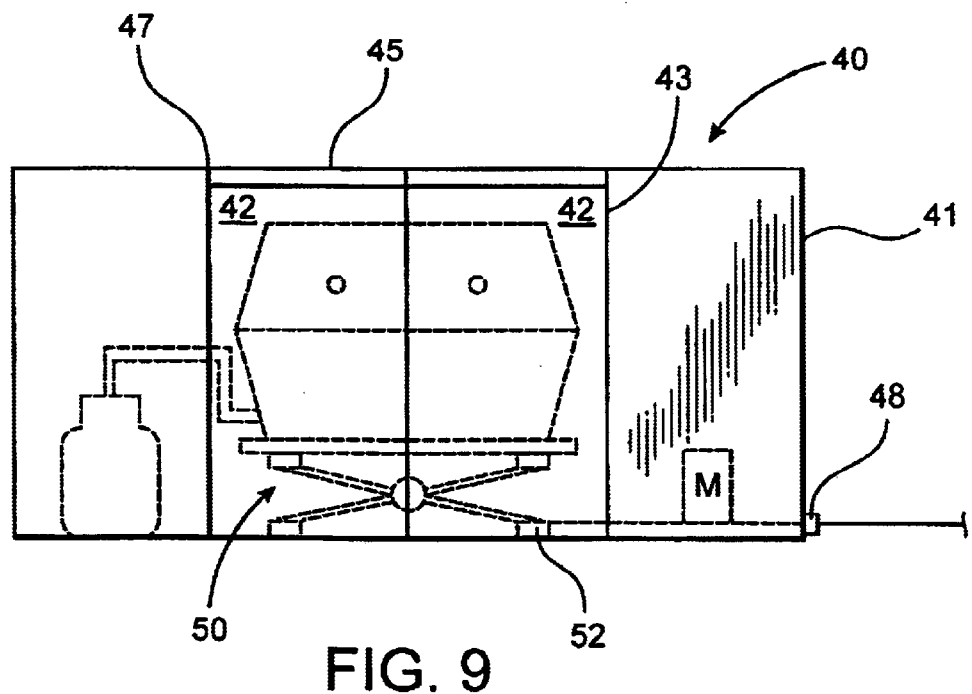
FIG. 9 is a front elevation of the enclosure of FIG. 8 illustrating a substantially enclosed configuration.

Additionally, this embodiment provides for an adjustable support mechanism 50 disposed within the housing 41, the support mechanism 50 being structured to support the outdoor cooking device in at least an operative orientation. Further, the present embodiment includes a lift mechanism 52 interconnected to the adjustable support mechanism 50 which is structured to selectively raise and lower the support mechanism 50 and the outdoor cooking device, while disposed within the housing 41. The lift mechanism 52 may comprise a simple scissor-type mechanism as illustrated in FIGS. 8 and 9, however, it is understood to be within the scope of the present invention to employ any known mechanism utilized to raise and lower an object. Further, the lift mechanism 52 may be manually operated, or it may be power driven, such as, for example, via an electric motor. The housing 41 may include a power inlet port 48 to facilitate the introduction of an electric power supply line, as required. Similar to the supply port 32 described above, the power inlet port 48 is structured to engage at least a portion of the electric power supply line and the housing 41, so as to maintain a substantial seal through the housing 41. In yet another embodiment, the lift mechanism 52 may be hydraulically powered.

In one preferred embodiment, the existing outdoor cooking device is substantially enclosed within the housing 41 while the door or doors 42 are disposed in the closed position, and the housing cover 45 is disposed in the storage position. Specifically, the housing 41 is structured to substantially enclose an existing outdoor cooking assembly so as to restrict access to an interior of the device by the elements and/or various pests, including at least those identified above.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. An outdoor cooking apparatus comprising:
a base having a lid movably mounted thereto,
said lid being disposable between an open configuration and a closed configuration,
a main seal disposed along a main interface between said base and said lid,
said closed configuration being at least partially defined by said lid disposed in a substantially enclosing relation to an upper portion of said base along said main seal,
a skirt disposed in an overlying relation to a lower portion of said base and interconnected thereto,
a skirt cover structured to engage said skirt and being disposable between an operable configuration and a storage configuration, and
said storage configuration is at least partially defined by said skirt and said skirt cover disposed in a substantially enclosing relation to said lower portion of said base.

2. An apparatus as recited in claim 1 wherein said lid comprises a ventilation port.

3. An apparatus as recited in claim 2 further comprising a ventilation cover structured to operatively engage at least a portion of said lid and substantially seal said ventilation port while said apparatus is not in use.

4. An apparatus as recited in claim 3 wherein said lid is not disposable into said open configuration while said ventilation cover operatively engages said portion of said lid.

5. An apparatus as recited in claim 1 wherein said lid comprises at least one rotisserie port to permit at least one end of a rotisserie rod to extend therethrough while said lid is disposed in said closed configuration.

6. An apparatus as recited in claim 5 further comprising a rotisserie cover structured to engage and substantially seal said rotisserie port while said apparatus is not in use.

7. An apparatus as recited in claim 1 wherein said lid comprises an ignition port structured to permit insertion of a source of ignition therethrough to ignite an amount of fuel while said lid is disposed in said closed configuration.

8. An apparatus as recited in claim 7 further comprising an ignition cover structured to engage and substantially seal said ignition port while said apparatus is not in use.

9. An enclosure for an outdoor cooking device comprising:
a housing cooperatively engaging the outdoor cooking device,
said housing comprising at least one door disposable between an open position and a closed position,
a doorway seal disposed along a doorway interface between said housing and said door,
a housing cover structured to engage said housing and being disposable between an operable position and a storage position,
a housing seal disposed along a housing interface between said housing and said housing cover,
an adjustable support mechanism disposed within said housing and structured to support the outdoor cooking device in at least an operative orientation,
a lift mechanism interconnected to said adjustable support mechanism and structured to selectively raise and lower said adjustable support mechanism and the outdoor cooking device within said housing, and
the outdoor cooking device being substantially enclosed within said housing while said door is disposed in said closed position and said housing cover is disposed in said storage position.

10. An enclosure as recited in claim 9 wherein adjustable support mechanism is further structured to support the outdoor cooking device in a stored orientation.

11. An enclosure as recited in claim 9 wherein said lift mechanism is manually operated.

12. An enclosure as recited in claim 9 wherein said lift mechanism is hydraulically powered.

13. An enclosure as recited in claim 9 wherein said lift mechanism is electrically powered.

14. An enclosure as recited in claim 13 further comprising a power inlet port mounted to said housing and structured to engage at least a portion of an electric power supply line and said housing, and maintain a substantial seal through said housing.

15. An enclosure as recited in claim 9 comprising a plurality of doors, each of said plurality of doors being disposable between said open position and said closed position.

16. An outdoor cooking apparatus comprising:

a base having a lid movably mounted thereto, said lid being disposable between an open configuration and a closed configuration, a main seal disposed continuously along a main interface of said base and said lid, said closed configuration being at least partially defined by said lid disposed in a substantially enclosing relation to an upper portion of said base along said main seal, a plurality of ports formed in said apparatus in a communicating relation to an interior of said apparatus, a port seal assembly structured and disposed in a sealing engagement with at least some of said plurality of ports, and said main seal and said port seal assembly structured to restrict access to said interior of said apparatus while said lid is disposed in said closed configuration and said port seal assembly is disposed in said sealing engagement.

17. An apparatus as recited in claim 16 further comprising a skirt disposed in an overlying relation to at least a lower portion of said base.

18. An apparatus as recited in claim 17 comprising a skirt cover structured to engage said skirt and being disposable between an operable configuration and a storage configuration.

19. An apparatus as recited in claim 18 wherein said storage configuration is at least partially defined by said skirt and said skirt cover structured to further restrict access to said lower portion of said base while said skirt cover is disposed in said storage configuration.

20. An apparatus as recited in claim 16 wherein at least one of said ports comprises a ventilation port.

21. An apparatus as recited in claim 20 wherein said port seal assembly comprises a ventilation cover structured to engage and substantially seal said ventilation port while said apparatus is not in use.

22. An apparatus as recited in claim 21 wherein said lid is not disposable into said open configuration while said ventilation cover is disposed in said substantially sealing engagement with said ventilation port.

23. An apparatus as recited in claim 16 wherein at least one of said ports comprises a rotisserie port to permit at least one end of a rotisserie rod to extend therethrough while said lid is disposed in said closed configuration.

24. An apparatus as recited in claim 23 wherein said port seal assembly comprises at least one rotisserie cover structured to engage and substantially seal said rotisserie port while said apparatus is not in use.

25. An apparatus as recited in claim 16 wherein said plurality of ports comprise at least one pair of rotisserie ports to permit each end of a rotisserie rod to extend therethrough while said lid is disposed in said closed configuration.

26. An apparatus as recited in claim 25 wherein said port sealing assembly comprises a pair of rotisserie covers each structured to engage and substantially seal a different one of said pair of rotisserie ports while said apparatus is not in use.

27. An apparatus as recited in claim 16 wherein at least one of said ports comprises an ignition port structured to permit insertion of an ignition source therethrough to ignite a fuel supply while said lid is disposed in said closed configuration.

28. An apparatus as recited in claim 27 wherein said port sealing assembly comprises an ignition cover structured to engage and substantially seal said ignition port while said apparatus is not in use.

29. An outdoor cooking apparatus comprising:

a base having a lid movably interconnected thereto, said lid being disposable between an open configuration and a closed configuration, a main seal disposed along a main interface of said base and said lid, said closed configuration being at least partially defined by said lid disposed in a substantially enclosing relation to an upper portion of said base along said main seal, a plurality of ports formed in said apparatus in a communicating relation to an interior of said apparatus, a port seal assembly structured and disposed in a sealing engagement with at least some of said plurality of ports, said main seal and said port seal assembly structured to at least partially restrict access to said interior of said apparatus while said lid is disposed in said closed configuration and said port seal assembly is disposed in said sealing engagement, a skirt disposed in an overlying relation to a lower portion of said base and interconnected thereto, a control panel at least partially mounted to said skirt and structured to operatively engage and control an amount of heat generated by at least one heating element disposed within said base, a skirt cover structured to engage said skirt and being disposable between an operable configuration and a storage configuration, and said storage configuration is at least partially defined by said skirt and said skirt cover further restricting access to said lower portion of said base while said skirt cover is disposed in said storage configuration.

30. An apparatus as recited in claim 29 further comprising a control cover disposable between a locked orientation and an unlocked orientation relative to said control panel.

31. An apparatus as recited in claim 30 wherein said locked orientation is at least partially defined by said control cover disposed to substantially restrict access to said control panel.

* * * * *